Patented Feb. 10, 1931

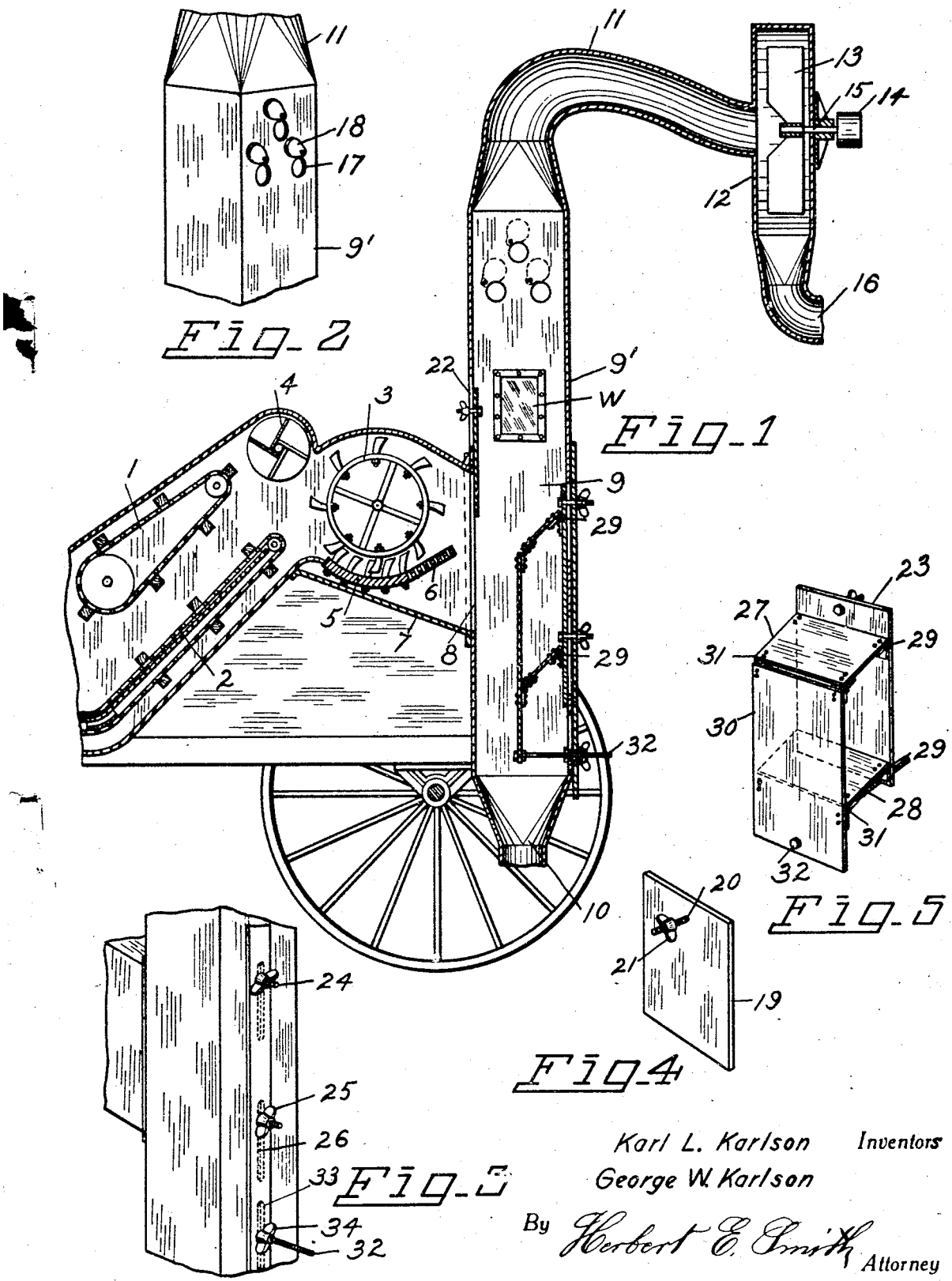

1,791,673

UNITED STATES PATENT OFFICE

KARL L. KARLSON AND GEORGE W. KARLSON, OF KENDRICK, IDAHO

THRASHING MACHINE

Application filed June 12, 1928. Serial No. 284,874.

In carrying out our invention we employ a suction draft for separating the straw and chaff from the grain and the latter is deposited by gravity in a suitable receptacle. The primary object of our invention is the provision of means whereby the most efficient conditions for the purpose of separating the straw and chaff from the grain, are secured in connection with the suction draft. Thus we utilize a chute or conveyor in communication with the thrashing machine at the cylinder and concave, and provide means within the chute for varying the area of the separating chamber for the purpose of adjusting the size of the chamber to the material being separated. This provides a regulating means whereby the size of the opening may be adjusted to a nicety so that the suction force of the air may be regulated to lift the chaff and straw, but at the same time allow the grain to fall.

Our invention consists in certain novel combinations and arrangement of parts as will hereinafter be more fully set forth and claimed.

In the accompanying drawings we have illustrated one complete example of the physical embodiment of our invention wherein the parts are combined and arranged according to the best mode we have so far devised for the practical application of the principles of our invention.

Figure 1 is a vertical sectional detail view of the appliance of our invention combined with a portion of a harvester-thrasher of well known type. Figure 2 is a perspective view of a portion of the straw chute showing vents in the chute. Figure 3 is a perspective view of a portion of the conveyor chute showing the adjusting means for the baffle plate in the separating chamber. Figure 4 is a detail perspective view of the check gate. Figure 5 is a perspective view of the baffle plate and its connections.

In order that the general arrangement and relation of parts may readily be understood we have illustrated in Figure 1 portions of a well known type of thrasher including the carriers 1 and 2 which deliver the grain to the thrashing cylinder 3, and the usual rotary beater 4 drives the grain against the teeth of the cylinder, after which the grain passes between the cylinder and the concave 5. A partial separation of the straw of the chaff and grain is effected by the thrashing cylinder and concave, and part of the thrashed grain and chaff fall through the concave 5 and grate 6 to the inclined grain pan 7, the straw being passed over the upper face of the grate. The grain and chaff separated from the straw flow down the inclined pan through an opening 8 into separating chamber 9 of the upright chute 9', and the heavier grains fall by gravity to the tapered outlet 10. From here the grain is carried by a suitable conveyor to destination for further treatment by the machine and finally deposited in a suitable receptacle.

The chute 9' is fashioned rectangular in cross section and at its upper end terminates in an intake or suction pipe 11 which leads to the fan casing 12, the fan casing being suitably supported on the thrasher. A rotary fan 13 within the casing is driven through its pulley 14 and shaft 15, and the straw is passed from the casing to a discharge pipe 16 and delivered for proper disposition in usual manner.

The suction from the fan is utilized to lift and convey the straw from the separating chamber 9 of the chute, and by means of the vent openings 17 in the wall of the chute, and the pivoted gates 18 for these openings, the suction may be accurately gaged to lift the lighter straw and chaff from the separating chamber and permit the heavier grain to fall by gravity to the discharge outlet 10.

A window is indicated at W in the chute so that conditions within the chute at the separating chamber 9 may be observed from the exterior of the chute and means are provided within the separating chamber for most efficiently causing separation of the straw and chaff from the grains.

An adjustable slide gate 19 is used in the upper part of the opening 8 to vary the area of this opening for the purpose of preventing grain from being thrown upwardly through the opening by the cylinder, and this slide or check gate is adjustable by the arrangement of a clamp bolt 20 and nut 21 with the slot 22 in the chute 9'.

Means are provided for varying the area of the separating chamber 9 and the opening 8 in order to secure the best possible conditions for separating the straw and chaff from the grain. These means include a base plate 23 which is held against the inner face of a wall of the chute 9' by means of bolts 24 and nuts 25. The bolts are passed through slots 26 in the wall of the chute 9' and this slotted arrangement permits the base plate to be adjusted vertically within the chute. The base plate is located adjacent to the opening 8 and it is provided with a pair of upper and lower plates 27 and 28 that are hinged at 29 to the base plate. These adjustable plates 27 and 28 are of a width sufficient to close the chute, but are adjustable to vary the space between the slotted wall of the chute and the opening 8. At the free ends of these adjustable plates 27 and 28 a baffle plate 30 is hinged as at 31, and this baffle plate which extends below the lower plate 28 is provided with a bolt 32 which passes through a slot 33 in the chute and a clamp nut 34 on the bolt is used to clamp the bolt in the slotted wall. From this description it will be understood that the vertically disposed baffle plate 30 remains at all times in a vertical plane while the two hinged plates 27 and 28 are adapted to swing on a horizontal axis for elevating or lowering the upper plate with relation to the opening 8 and the check plate 22 of the opening. The baffle plate may thus be swung on its hinges 29 to increase or diminish the area of the separating chamber and the upper plate 27 forms a deflector to guide the straw and chaff upwardly from the separating chamber through the chute 9'. The grain passing through the opening 8 strikes against the baffle plate 30 and falls by gravity into the outlet 10. Thus by adjusting the nuts and bolts 24 and 25 and bolt 32 with its nut 34 the baffle plate 30 and the deflector plate 27 may be adjusted to vary the area of the separating chamber to provide the best possible conditions for such separation by the suction of air due to the action of the fan 13.

Having thus fully described our invention, what we claim as new and desire to secure by Letters Patent is:—

1. The combination in a separator with a chute forming a separating chamber and means for creating suction in the chute, of a vertically disposed baffle plate located in front of an opening in a wall of the chute, a deflector plate hinged at the top of the baffle plate and having a hinge support on the chute, means for supporting the lower free end of the baffle plate, and means for adjusting and retaining said baffle plate and deflector plate.

2. The combination in a separator with a separating chute, of an interior base plate and bolts for co-action with a slotted wall of the chute for retaining the base plate in adjusted position, an upper and a lower plate hinged to the base plate, a baffle plate hinged at the free edges of these upper and lower plates, and means supported in a slotted wall of the chute for vertically adjusting the baffle plate and thereby varying its distance from the slotted wall.

In testimony whereof we affix our signatures.

KARL L. KARLSON.
GEORGE W. KARLSON.